(No Model.) 2 Sheets—Sheet 1.
L. GUTMANN.
SYSTEM OF ELECTRICAL DISTRIBUTION.
No. 431,460. Patented July 1, 1890.
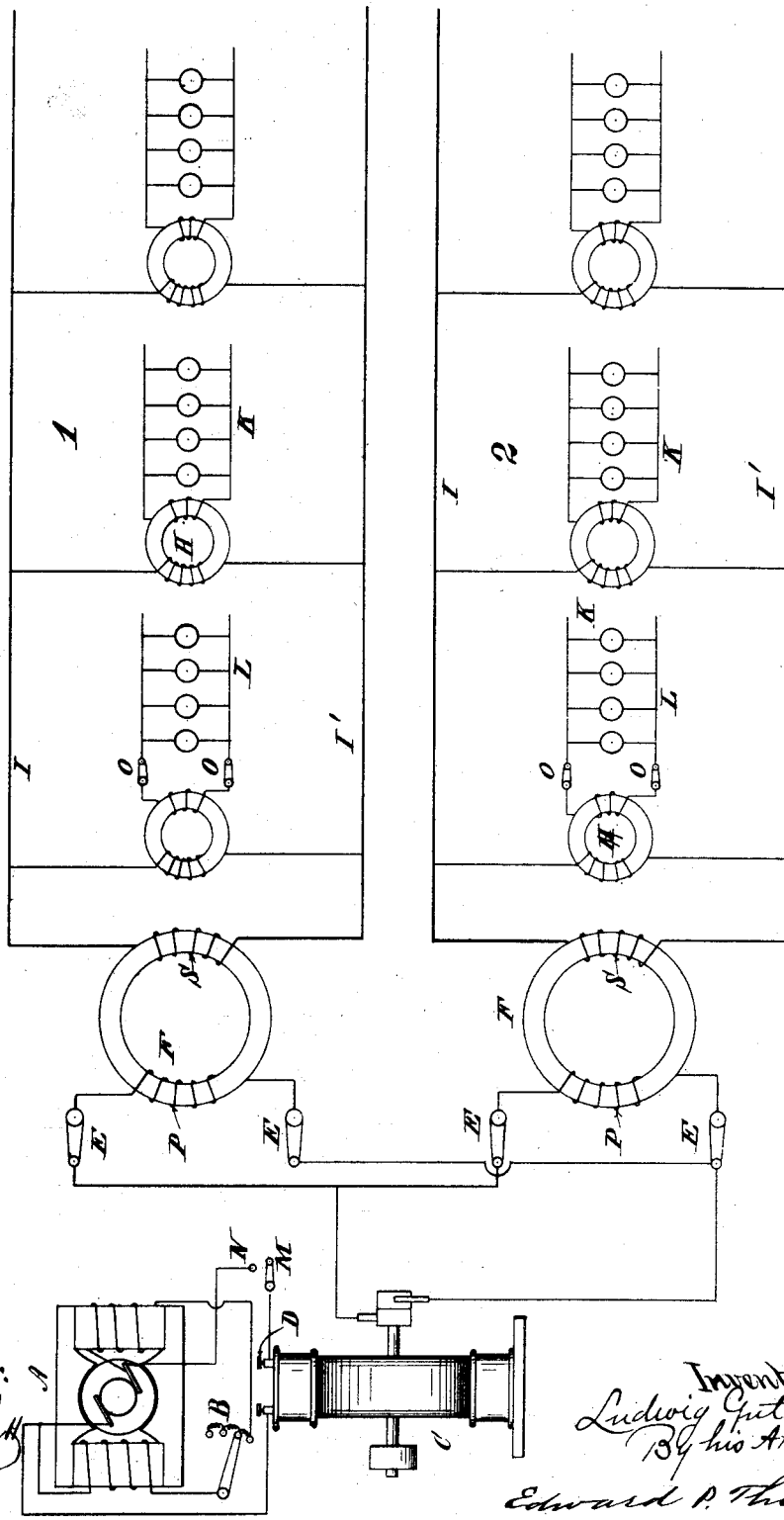

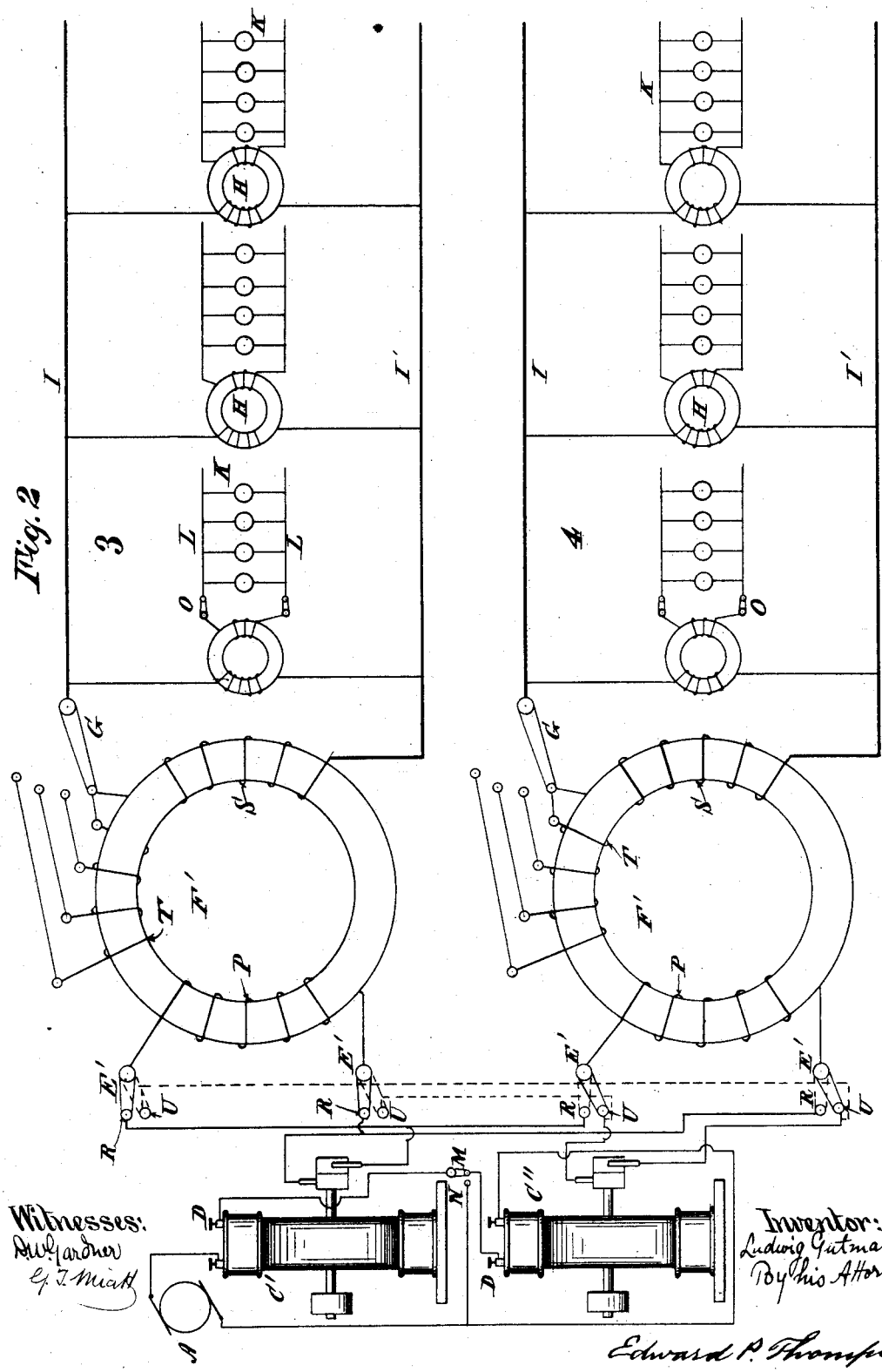

UNITED STATES PATENT OFFICE.

LUDWIG GUTMANN, OF FORT WAYNE, INDIANA.

SYSTEM OF ELECTRICAL DISTRIBUTION.

SPECIFICATION forming part of Letters Patent No. 431,460, dated July 1, 1890.

Application filed January 25, 1889. Serial No. 297,567. (No model.)

*To all whom it may concern:*

Be it known that I, LUDWIG GUTMANN, a subject of the Emperor of Germany, and a resident of Fort Wayne, in the county of Allen and State of Indiana, have invented certain new and useful Improvements in Systems of Electrical Distribution, (Case 24,) of which the following is a specification.

This system of electrical distribution has for its objects, first, reduction of danger to those handling the generator and translating devices; secondly, to safeguard the generator and instruments from destruction by short circuits or lightning, and, lastly, to have a convenient and economical means for regulating the pressure in the feeder-circuits at the source without interposing other complicated devices at different points in the circuit.

The whole organization is shown in the drawings.

In Figures 1 and 2, (the second figure being a modification of the first,) A is an exciter. B is a rheostat; C C′ C″, generators for producing either alternating, undulating, or pulsating currents; D, field-magnet terminals; E, circuit-closers; E′, double-pole two-way switches; F, station-converter; F′, adjustable station-converter; G, main-circuit switch; H, distributing-converters; I I′, primary main feeders; K, translating devices; L, secondary conductors; M, field-magnet circuit-switches; N, contact terminal in exciting field-circuit; O, switches in secondary or work circuit of converters H; P primary, S secondary, and T third or regulating, coils; R, dynamo terminal contacts of dynamo C′, and U terminal contacts of dynamo C″.

The dynamo A, of which the power can be altered by rheostat B, which is placed in series with the field-magnet coils of the exciter, excites the field-magnet coils of generators C, C′, and C″, all field-magnet coils of the different dynamos being supplied by the same exciter. This condition is not at all necessary, as each dynamo may be excited by a different exciter. Switches M in the field-magnet circuit are for the purpose of cutting out or in generators by moving switch M over to contact N. The current from dynamo C goes from the armature over switches E to the primary coils P of the station-converters F and returns back to dynamo. The current induced in the secondary coil of the said station-converter F circulates through the distributing-lines I′, in which distributing-converters H are connected at all the places of consumption or near such places. In circuit with the secondary coils of the converters H are placed translating devices K and switches O, which are provided to cut out of circuit or to put into circuit more or less number of such translating devices. Each of the feeder-circuits 1, 2, 3, and 4 has its own station-converter. Circuits 1 and 2 are fed here by the same dynamo. Circuit 3 is connected to dynamo C′ at the terminals R. Circuit 4 is connected with dynamo C″ at the terminals U. At light loads it may often be convenient to supply several circuits from the same alternating, pulsating, or undulating current dynamo. One such method is indicated by the switch arrangement and connections of dynamos C′ C″. Each dynamo is provided with four terminals. Those of C are R. Those of C″ are U. The switches E′ are of such construction as to be either in contact with terminals R or U, as indicated by the dotted switches. To obtain clearness of the connections the terminal connections of U are shown in dotted lines. Converters F′ are of such a construction as to be able to vary the ratio of conversion at the source and to cause thereby the alteration of pressure in the feeder-circuit at different loads for the purpose of keeping the potential at the points of supply constant under any load and loss in line. In this case coil T, (a third coil,) reacting against the secondary, is the regulating device. It will be noticed that the conductors coming from the dynamo are very short, and as they remain in the station it is easy to give them such insulation that they may be handled without danger, or else they may be incased or else other precautions provided to prevent a person from making ground-connection. In case of a ground or short circuit or lightning taking place on circuit I′ the secondary coil of the station-converters will have to stand the greatest strain, while the dynamo-circuit will hardly ever be interrupted, having always the primary coil or coils of the station-converters in circuit.

I claim as my invention—

1. In a system of alternating-current distribution, the combination of an electric converter, a cord, a primary coil, and a secondary coil for the converter, translating devices in circuit with the secondary coil of the converter, an additional coil mounted on the converter's core independent of the converter's coils, and means, such as a switch, for including said additional coil in circuit with one of the converter's coils.

2. In a system of alternating-current distribution, the combination of an electric converter, a core, a primary coil, and a secondary coil for the converter, translating devices in circuit with the secondary coil of the converter, an alternating-current dynamo in circuit with the primary coil, an additional coil mounted on the said core, and means for including the additional coil in circuit with the said secondary coil.

3. In a system of electrical distribution, the combination of a generator for producing alternating, pulsating, or undulatory electric currents, a direct-current dynamo for exciting the field-magnets of the generator, a station-converter for each feeder-circuit, distributing-converters connected into the feeder-circuits, substantially at the places of consumption, and translating devices operated in the secondary circuits of said distributing-converters.

4. In a system of electrical distribution, the combination of an alternating-current generator and exciter for energizing the field of the generator, a station-converter for each feeder-circuit, means for altering the pressure in the feeders applied to the station-converters, distributing-converters placed at the places of consumption in multiple arc across the feeders, and translating devices connected to the secondary of the distributing-converters.

In testimony that I claim the foregoing as my invention I have signed my name, in presence of two witnesses, this 21st day of January, 1889.

LUDWIG GUTMANN.

Witnesses:
    DANL. RYAN,
    WILLIAM C. RYAN.